UNITED STATES PATENT OFFICE.

HENRY T. CHAMPNEY, OF NEW YORK, N. Y.

FOOD COMPOUND.

SPECIFICATION forming part of Letters Patent No. 393,459, dated November 27, 1888.

Application filed August 22, 1888. Serial No. 283,440. (No specimens.)

*To all whom it may concern:*

Be it known that I, HENRY T. CHAMPNEY, a citizen of the United States, residing in the city, county, and State of New York, have invented a certain new and useful Composition of Matter for Use as a Fluid Food, of which the following is a specification.

My composition consists of the following ingredients, preferably combined in the proportions stated—namely: defibrinated blood, sixty-five gallons; whisky, fifteen gallons; glycerine, 3.5 gallons; albumen, (dried,) 13.5 pounds; boracic acid, 1.5 pound; chloride of sodium, (common salt,) 1.5 pound.

The above-named ingredients are to be thoroughly mingled by agitation, and after being subjected to a ripening process for about thirty days the product may be bottled in such manner as to exclude the air, and put on the market ready for use. This preparation constitutes a fluid food, and it is especially useful in cases of physical weakness, general debility, and any derangement of the digestive organs.

I prefer to make use of bullocks' blood—that is, the blood of beef animals—freshly drawn, although the blood of healthy sheep may be substituted. The blood is defribrinated in any of the usual ways, a convenient and economical way being to take the blood just as it is drawn from the animal and subject it to a vigorous stirring from ten to fifteen minutes, which will prevent coagulation and will aggregate the fibrine, so that it can be readily separated. This separation is effected by passing the stirred blood through a fine sieve of about one hundred and twenty to one hundred and thirty meshes to the inch, when the fibrine will be left on the sieve and the remaining parts will pass through.

I prefer to use Bourbon whisky, although other brands of good quality will answer.

I prefer to use chemically-pure glycerine.

I prefer to use albumen obtained from eggs, although albumen from other sources will give fair results. In practice I have, for convenience and economy, used the desiccated whites of eggs, which, before being mingled with the other ingredients, are dissolved in water at a temperature of about 120° Fahrenheit. The proportion given above is for the desiccated albumen before it is dissolved.

The boracic acid and chloride of sodium are obtained in their common crystalline conditions, and should be reduced to a fine powder before being mingled with the other ingredients.

As the above named ingredients are brought together they are thoroughly incorporated by agitation. For this purpose a centrifugal mixing-machine may be advantageously employed. When the mixing is completed, the fluid is drawn off into barrels or other receptacles, which are bunged or otherwise secured to prevent admission of the air, and it is then preferably allowed to stand in a cool place for about thirty days for the purpose of ripening, when it can be bottled and is ready for use.

I have ascertained by a long series of experiments that the proportions of the several ingredients, as above stated, give the best practical results, although I have learned by my experiments that a marketable preparation similar in its effects can be produced by departing somewhat from the proportions above named.

This fluid food is preferably administered, in cases of extreme weakness and irritability of the digestive organs, in small doses, beginning with ten to twenty drops diluted with about the same quantity of water or milk and repeated every half-hour, as the patient can bear it, to four table-spoonfuls per day for an adult. Larger doses are given with benefit, where the strength of the patient will bear it. From five to ten drops may be given to bottle-fed infants in their milk at each feeding.

What is claimed as new is—

The herein-described composition of matter for use as fluid food, consisting of defibrinated blood, whisky, glycerine, albumen, boracic acid, and chloride of sodium, in the proportions substantially as specified.

HENRY T. CHAMPNEY.

Witnesses:
F. E. HARTLEY,
F. B. MURPHY.